(12) United States Patent
Kim

(10) Patent No.: US 8,864,198 B2
(45) Date of Patent: Oct. 21, 2014

(54) TUBULAR BACK BEAM FOR VEHICLE

(75) Inventor: Hyun Gyung Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/533,735

(22) Filed: Jun. 26, 2012

(65) Prior Publication Data

US 2013/0147217 A1 Jun. 13, 2013

(30) Foreign Application Priority Data

Dec. 12, 2011 (KR) .......................... 10-2011-0133136

(51) Int. Cl.
*B60R 19/12* (2006.01)

(52) U.S. Cl.
USPC ....... 293/146; 293/148; 293/122; 296/187.11

(58) Field of Classification Search
USPC ......... 293/102, 122, 130, 132, 133, 146, 148, 293/151, 155; 296/30, 187.1, 187.11, 296/203.04
See application file for complete search history.

(56) References Cited

U.S. PATENT DOCUMENTS

| | | | | | |
|---|---|---|---|---|---|
| 2,553,237 | A | * | 5/1951 | Camarero | 267/170 |
| 5,031,947 | A | * | 7/1991 | Chen | 293/135 |
| 6,203,078 | B1 | | 3/2001 | Karrer | |
| 7,044,516 | B2 | * | 5/2006 | Kobayashi et al. | 293/146 |
| 8,439,412 | B2 | * | 5/2013 | Klimek | 293/133 |
| 2005/0116498 | A1 | | 6/2005 | Kobayashi et al. | |

FOREIGN PATENT DOCUMENTS

JP 2005-153750 6/2005

\* cited by examiner

*Primary Examiner* — Glenn Dayoan
*Assistant Examiner* — Jason S Daniels
(74) *Attorney, Agent, or Firm* — Morgan, Lewis & Bockius LLP

(57) ABSTRACT

A tubular back beam for a vehicle is provided to effectively cope with crashes, including a head-on crash, an offset crash, etc., thus promoting excellent crashworthiness, and thereby maximally reducing damage to a vehicle body, in addition to maximally mitigating injuries to a pedestrian and a passenger.

5 Claims, 5 Drawing Sheets

TUBULAR BACK BEAM FOR VEHICLE

CROSS-REFERENCE TO RELATED APPLICATIONS

The present application claims priority of Korean Patent Application Number 10-2011-0133136 filed Dec. 12, 2011, the entire contents of which application is incorporated herein for all purposes by this reference.

BACKGROUND OF INVENTION

1. Field of Invention

The present invention relates generally to a tubular back beam for a vehicle and, more particularly, to a tubular back beam for a vehicle, which is manufactured in the form of a tube to satisfy crashworthiness.

2. Description of Related Art

As a measure to protect a passenger as well as a vehicle body against a crash, back beams are mounted to the front and rear of the vehicle.

FIG. 1 illustrates an example of a tubular back beam. A conventional tubular back beam 10 is configured so that upper and lower beams 11 and 12 each having a circular cross-section are spaced apart from each other in a vertical direction, and central portions of the upper and lower beams 11 and 12 are connected to each other using a connecting bracket 13. Stays 22 are provided on opposite ends of the upper and lower beams 11 and 12 to be coupled to side members 21.

The tubular back beam 10 configured as described above has a lower weight and less costs than a general integrated back beam. It is particularly advantageous because the upper and lower beams 11 and 12 can distribute and absorb the crash energy, respectively, thus more effectively satisfying crashworthiness.

However, the conventional tubular back beam 10 is problematic in that the upper and lower beams 11 and 12 are connected to each other using only one connecting bracket 13, so that the rigidity of the connection between the upper and lower beams 11 and 12 is low, and thus the crash energy separates the upper and lower beams 11 and 12 from each other, in which case it is impossible to effectively cope with a crash, thus increasing damage to a vehicle body and injury to occupants of the vehicle.

Further, the conventional tubular back beam 10 is problematic in that the connecting bracket 13 connecting the upper and lower beams 11 and 12 copes with a head-on crash, but there is no structure connecting the upper and lower beams 11 and 12 in the event of an offset crash of 40% or more, so that the back beam does not effectively cope with the offset crash.

An exemplar of the prior art is Japanese Patent Laid-Open Publication No. 2003-396437.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a tubular back beam for a vehicle, intended to increase connecting rigidity between upper and lower beams, thus preventing the upper and lower beams from being separated from each other by crash energy, and more effectively satisfying crashworthiness in particular for a head-on crash and an offset crash.

Various aspects of the present invention provide for a tubular back beam for a vehicle, including an upper beam and a lower beam spaced apart from each other in a vertical direction, each beam having a tubular structure, a plurality of connecting lugs disposed in a longitudinal direction of the upper and lower beams, and coupled to the upper and lower beams to connect the upper and lower beams to each other, a center bracket provided to connect central portions of the upper and lower beams in the longitudinal direction thereof to each other, and a pair of side brackets provided to connect opposite ends of the upper and lower beams to each other.

Each of the upper and lower beams may be formed to have a rectangular or elliptical cross-section to ensure rigidity.

If each of the upper and lower beams is formed to have the elliptical cross-section, a portion having a maximum diameter of each of the upper and lower beams may be placed in a direction from a front to a rear of the vehicle.

A maximum spacing distance between the upper and lower beams may be formed to be 100 mm to 110 mm.

A pitch interval between the connecting lugs may be 1.8 to 2.2 times as long as the maximum spacing distance between the upper and lower beams.

Each of the connecting lugs may be formed to have a circular cross-section, and may be welded at opposite ends thereof to the upper and lower beams.

Each of the connecting lugs may be formed to have a U-shaped cross-section that is open in a direction where a side member is located, and may be welded at opposite ends thereof to the upper and lower beams.

One end of a crash box may be coupled to each of the opposite ends of the upper and lower beams in such a way as to face the side bracket, and the other end of the crash box may be coupled to the side member.

The tubular back beam for the vehicle according to the present invention is advantageous in that it can effectively cope with crashes including a head-on crash and an offset crash, etc., thus promoting excellent crashworthiness, and thereby maximally reducing damage to the vehicle body, and maximally mitigating injuries to a pedestrian and a passenger.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
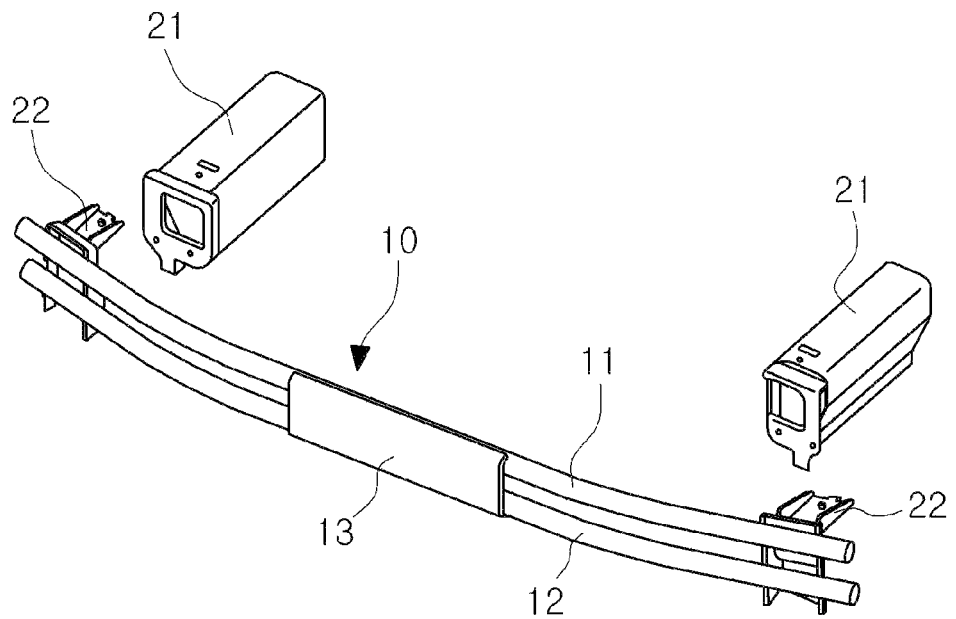
FIG. 1 is a view illustrating a conventional tubular back beam for a vehicle.
Figure 2:
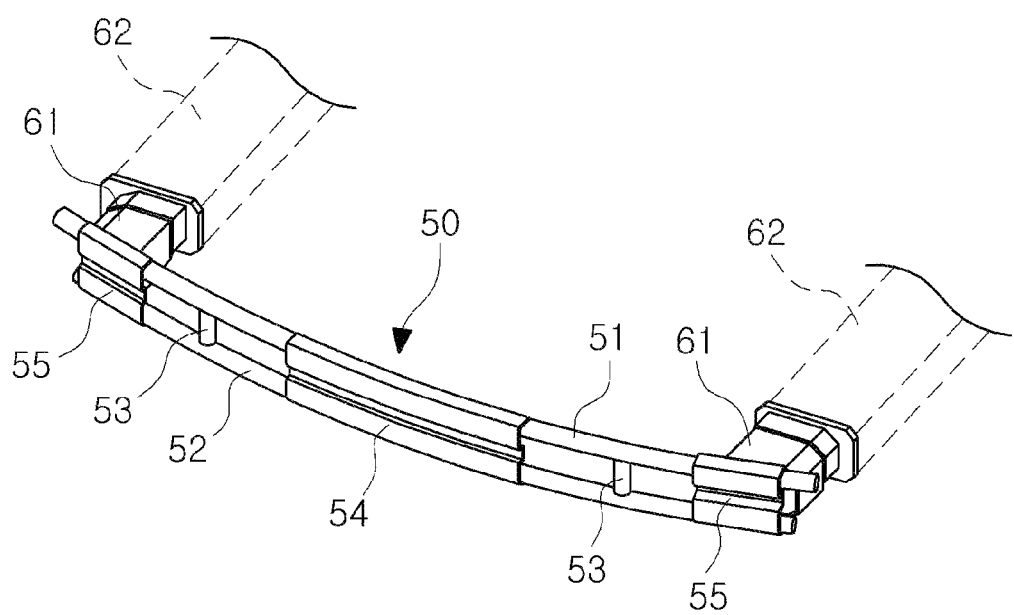
FIG. 2 is an assembled perspective view showing an exemplary tubular back beam for a vehicle in accordance with the present invention.
Figure 3:
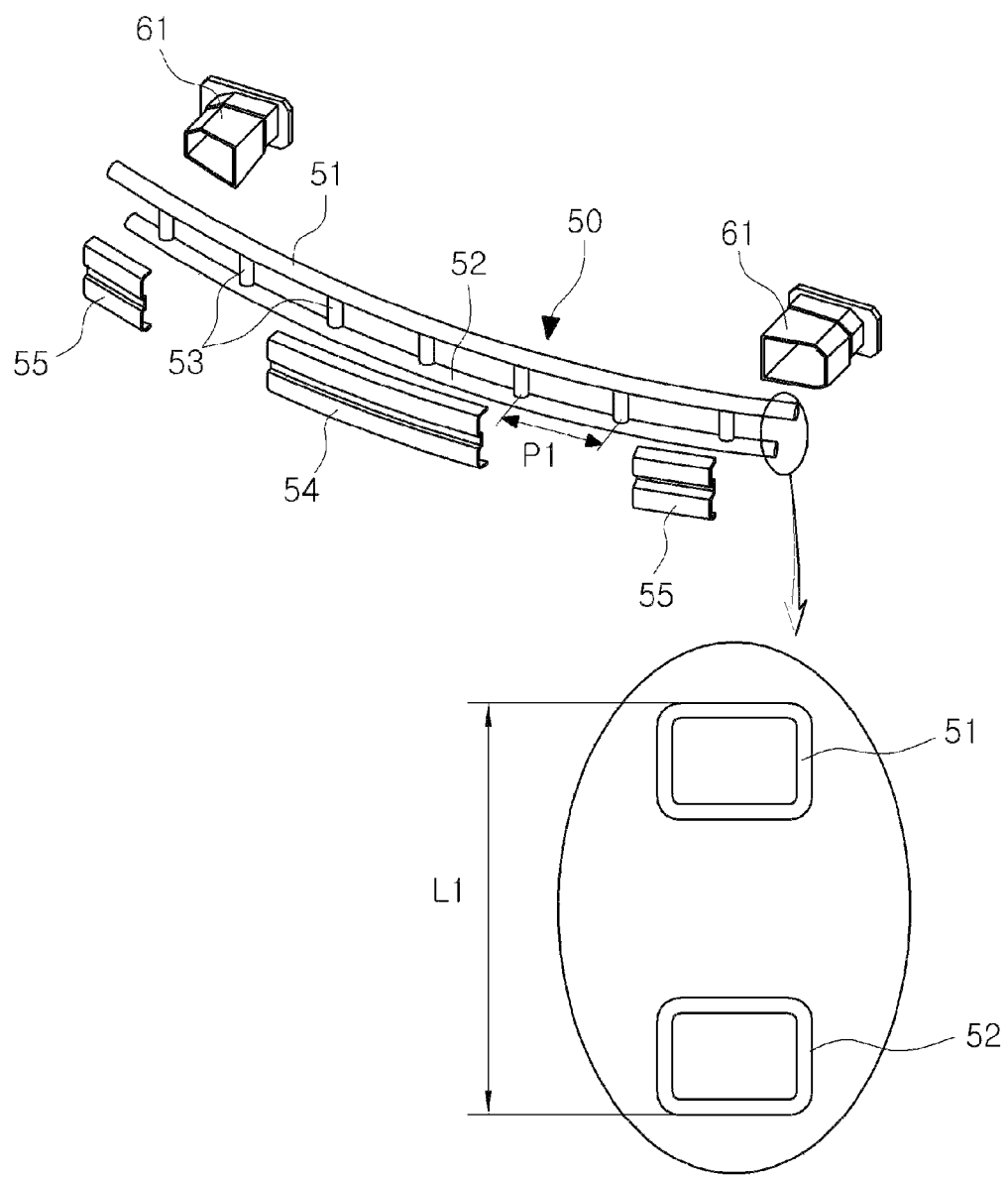
FIG. 3 is an exploded perspective view of FIG. 2.

As shown in FIGS. 2 and 3, the tubular back beam 50 for the vehicle in accordance with various embodiments of the present invention includes upper and lower beams 51 and 52, a plurality of connecting lugs 53, a center bracket 54, and a pair of side brackets 55. The upper and lower beams 51 and 52 each have a tubular structure and are spaced apart from each other in a vertical direction. The connecting lugs 53 are disposed in the longitudinal direction of the upper and lower beams 51 and 52, and are coupled to the upper and lower beams 51 and 52 to connect the upper and lower beams 51 and 52 to each other. The center bracket 54 is provided to connect central portions of the upper and lower beams 51 and 52 in the longitudinal direction thereof to each other. The side brackets 55 are provided to connect opposite ends of the upper and lower beams 51 and 52 to each other.

Here, the connecting lugs 53 serves to remarkably increase the rigidity of the connection between the upper and lower beams 51 and 52. Thus, even when crash energy is transmitted to the upper and lower beams 51 and 52, they do not separate from each other in the vertical direction owing to the coupling force of the connecting lugs 53. As a result, it can effectively cope with the crash and damage to a vehicle body and the injury to a passenger can be reduced.

Further, the center bracket 54 ensures a support force that can effectively cope with a head-on crash and an offset crash of about 15%, while the pair of side brackets 55 ensures a support force that can effectively cope with an offset crash of 40% or more.

Therefore, the tubular back beam 50 according to the present invention can effectively cope with the crash energy under all conditions, maximally reduce damage to the vehicle body, and considerably mitigate the injuries to vehicle occupants.

Meanwhile, one end of a crash box 61 is coupled to each of the opposite ends of the upper and lower beams 51 and 52 in such a way as to face the side bracket 55, while the other end of the crash box 61 is coupled to a side member 62.

Figure 4:
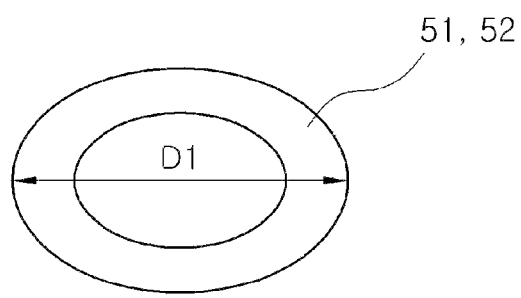
FIG. 4 is a sectional view showing exemplary upper and lower beams in accordance with the present invention.

In order to ensure rigidity, each of the upper and lower beams 51 and 52 according to the present invention preferably has a rectangular cross-section or an elliptical cross-section as shown in FIG. 4.

As an example, each of the upper and lower beams 51 and 52 may be formed as a tubular beam having a circular cross-section. However, a drawback of the circular cross-section is that it is less rigid than the rectangular or elliptical cross-section. Thus, each of the upper and lower beams 51 and 52 according to the present invention is formed to have a rectangular or elliptical cross-section while avoiding a circular cross-section so as to ensure excellent rigidity.

Further, a triangular cross-section is possible if necessary.

If each of the upper and lower beams 51 and 52 has an elliptical cross-section, a portion having a maximum diameter D1 of each of the upper and lower beams 51 and 52 is preferably installed in a direction from the front to the rear of the vehicle so that the vehicle is rendered sufficiently crashworthy for crash energy.

Further, a maximum spacing distance L1 between the upper beam 51 and the lower beam 52 according to the present invention is preferably 100 mm to 110 mm.

If the spacing distance between the upper beam 51 and the lower beam 52 is set to be 100 mm or less, the rigidity of the upper and lower beams 51 and 52 becomes excessively large. In this case, an injury to a pedestrian disadvantageously becomes large in the event of a collision involving a pedestrian.

On the contrary, if the spacing distance between the upper beam 51 and the lower beam 52 is set to be 110 mm or more, a gap between the upper and lower beams 51 and 52 becomes too large, the upper and lower beams 51 and 52 may be separated from each other by crash energy. In this case, it is impossible to effectively cope with a crash.

Therefore, the maximum spacing distance L1 between the upper beam 51 and the lower beam 52 according to the present invention is preferably 100 mm to 110 mm in order to effectively cope with the crash and protect pedestrians.

Further, a pitch interval P1 between the connecting lugs 53 is preferably formed to be 1.8 to 2.2 times as long as the maximum spacing distance L1 between the upper beam 51 and the lower beam 52.

If the pitch interval P1 between the connecting lugs 53 is set to be 1.8 times or less the maximum spacing distance L1 between the upper beam 51 and the lower beam 52, the rigidity of the upper beam 51 and the lower beam 52 becomes excessively high because of the connecting lugs 53. In this case, an injury to a pedestrian disadvantageously becomes large in the event of a collision involving a pedestrian.

On the contrary, if the pitch interval P1 is set to be 2.2 times or more the maximum spacing distance L1, the rigidity of the upper beam 51 and the lower beam 52 may be reduced. In this case, it is impossible to effectively cope with a crash.

Hence, according to the present invention, in order to effectively cope with a crash and protect a pedestrian, the pitch interval P1 between the connecting lugs 53 is formed to be 1.8 to 2.2 times the maximum spacing distance L1 between the upper and lower beams 51 and 52.

Figure 5:
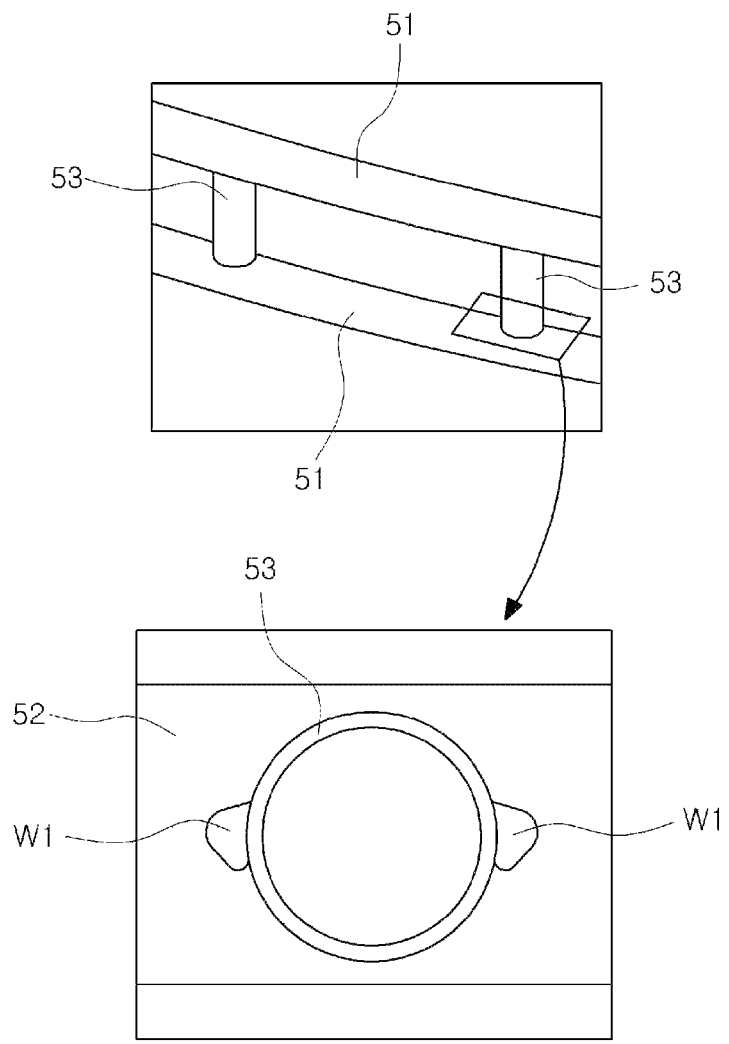
FIGS. 5 and 6 are views illustrating an exemplary connecting lug in accordance with the present invention.
Figure 6:
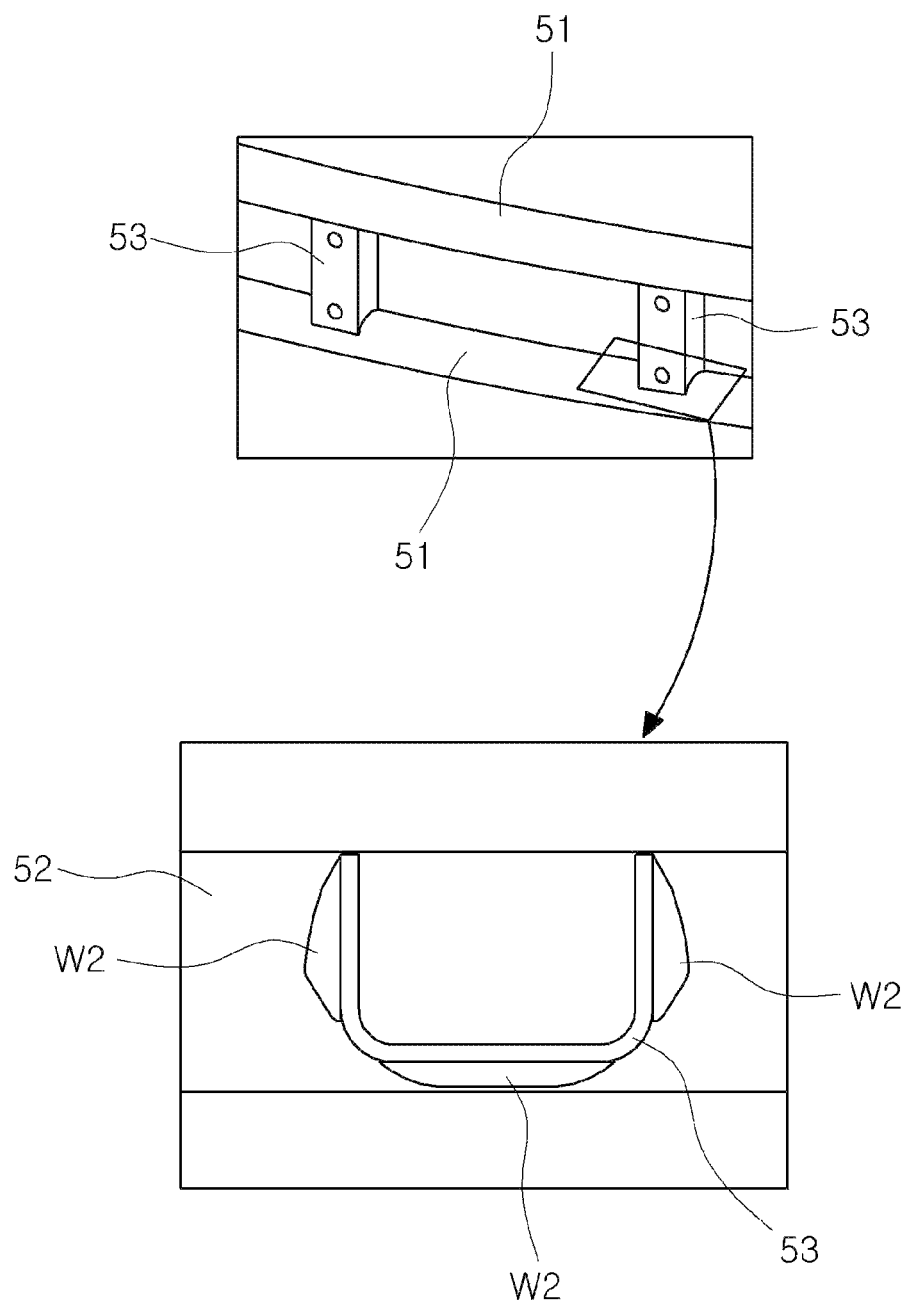

According to the present invention, the cross-section of the connecting lug 53 may be a circular cross-section as shown in FIG. 5 or a U-shaped cross-section that is open in a direction where the side member 62 is located as shown in FIG. 6.

The connecting lug 53 having the circular cross-section is advantageous because it ensures rigidity, and the connecting lug 53 having the U-shaped cross-section is advantageous in terms of reduction in weight and cost.

Further, opposite ends of the connecting lug 53 are welded to the upper beam 51 and the lower beam 52. As compared to a welded portion W1 of the connecting lug 53 having the circular cross-section, a welded portion W2 of the connecting lug 53 having the U-shaped cross-section is more convenient to perform a welding operation and enable more portions to be welded.

As described above, the present invention provides a tubular back beam, which can effectively cope with all crashes, including a head-on crash, an offset crash, etc., thus ensuring excellent crashworthiness, and thereby maximally reducing damage to a vehicle body, in addition to maximally mitigating injuries to a pedestrian and a passenger.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the claims appended hereto and their equivalents.

What is claimed is:

1. A tubular back beam for a vehicle, comprising:
an upper beam and a lower beam spaced apart from each other in a vertical direction, each beam having a tubular structure;
a plurality of connecting lugs disposed along a longitudinal direction between the upper and lower beams and interconnecting the upper and lower beams;
a center bracket interconnecting central portions of the upper and lower beams in the longitudinal direction thereof to each other;
a pair of side brackets interconnecting opposite ends of the upper and lower beams to each other; and
a pair of crash boxes coupled to the opposite ends of the upper and lower beams,
wherein each respective crash box has one end facing a corresponding side bracket and an other end coupled to a side member such that ends of the upper and lower beams are disposed between the respective crash box and the corresponding side bracket;
wherein each of the connecting lugs includes a U-shaped cross-section that is open in a direction towards a side of the beams where the side member is located, and is welded at opposite ends thereof to the upper and lower beams;
wherein each of the upper and lower beams include a rectangular cross-section to ensure rigidity;
wherein a maximum spacing distance between the upper and lower beams is about 100 mm to 110 mm; and
wherein a pitch interval between the connecting lugs is about 1.8 to 2.2 times as long as the maximum spacing distance between the upper and lower beams.

2. The tubular back beam as set forth in claim 1, wherein the center bracket overlaps at least a connecting lug.

3. The tubular back beam as set forth in claim 2, wherein the center bracket overlaps three connecting lugs.

4. The tubular back beam as set forth in claim 1, wherein the side bracket overlaps at least a connecting lug.

5. The tubular back beam as set forth in claim 4, wherein each of the side brackets overlaps one connecting lug.

* * * * *